United States Patent
Challoner

(10) Patent No.: US 6,995,536 B2
(45) Date of Patent: Feb. 7, 2006

(54) LOW COST ROBOT MANIPULATOR

(75) Inventor: A. Dorian Challoner, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 299 days.

(21) Appl. No.: 10/408,376

(22) Filed: Apr. 7, 2003

(65) Prior Publication Data

US 2003/0178964 A1 Sep. 25, 2003

(51) Int. Cl.
B25J 15/02 (2006.01)
G05B 19/04 (2006.01)

(52) U.S. Cl. ............................ 318/568.21; 318/568.1; 318/568.11; 318/568.16; 318/568.2; 318/563; 318/567; 700/245; 901/2; 901/3

(58) Field of Classification Search ............... 318/563, 318/568.1–568.21, 567; 700/187–263; 901/2–47
See application file for complete search history.

(56) References Cited

U.S. PATENT DOCUMENTS

| | | | |
|---|---|---|---|
| 2,861,699 A | * 11/1958 | Youmans | 414/4 |
| 3,422,965 A | * 1/1969 | Lloyd | 414/5 |
| 3,589,134 A | * 6/1971 | Hackmann et al. | 405/191 |
| 4,221,997 A | * 9/1980 | Flemming | 700/245 |
| 4,919,586 A | 4/1990 | Derby | |
| 5,130,632 A | * 7/1992 | Ezawa et al. | 318/568.11 |
| 6,374,157 B1 | 4/2002 | Takamura | |
| 6,378,801 B1 | 4/2002 | Pell et al. | |
| 6,463,357 B1 | * 10/2002 | An et al. | 700/245 |
| 2001/0045128 A1 | 11/2001 | McCall et al. | |
| 2001/0046929 A1 | 11/2001 | Derby | |

FOREIGN PATENT DOCUMENTS

JP 1228783 A * 9/1989

OTHER PUBLICATIONS

Birch, Matthew et al, "Design of a Cricket Microrobot" Apr. 2000, IEEE International Robotic Conference, pp. 1109–1114.*
Will, Peter, "MEMS and Robotics: Promises and Problems" Apr. 2000, IEEE International Robotic Conference, pp. 938–946.*
ISTAR Integrated System Test of an Airbreathing Rocket, Rocket Based Combined Cycle Consortium, The Boeing Company, two pages.

* cited by examiner

Primary Examiner—David Martin
Assistant Examiner—Tyrone Smith
(74) Attorney, Agent, or Firm—Patent Venture Group

(57) ABSTRACT

The present invention discloses a robotic manipulator, comprising at least one joint, each joint having a drive axis and at least one microelectromechanical system (MEMS) inertial sensor aligned with at least one drive axis providing sensing of a relative position of the drive axis. The robotic manipulator can include an inertial measurement unit (IMU) coupled to the robotic manipulator for determining the end effector position and orientation. A controller can be used, receiving a signal from at least one MEMS inertial sensor and controlling at least one joint drive axis in response to the signal to change the relative position of the joint drive axis. Rate information from MEMS sensors can be integrated to determine the position of their respective drive axes.

22 Claims, 4 Drawing Sheets

LOW COST ROBOT MANIPULATOR

BACKGROUND OF THE INVENTION

1. Field of the Invention

The present invention relates to robotic manipulators, and in particular to cost-effective sensing systems for robotic manipulator. More particularly, this invention relates to inertial sensing applied to robotic manipulators.

2. Description of the Related Art

Currently, robots and remote manipulators with superior and reliable closed loop control are expensive because they employ multiple joints with expensive joint servo controllers. The high cost of motion sensors is a principal reason for the expense and weight of the joint servos of robotic manipulators and as a consequence the utility of robots versus other means of delivery or production, e.g. human labor. Typically, six joints are utilized with a tachometer and a position encoder employed at each joint, often at the input of a heavy, mechanically stiff, high class gear reduction system to increase output torque capability while maintaining output position accuracy. This is the design today of the Shuttle Remote Manipulator System (SRMS) which is 50 ft long comprising two shoulder joints, an elbow joint and three wrist joints and an end effector for payload grappling.

In addition, the sensors employed for robotic manipulators are often electromagnetic inductosyns, resolvers or optical position encoders. All such devices are inherently expensive if mounted at the joint output because they require large circumferential sensing discs around each joint. For example, the SRMS output joint diameters are of the order of eight inches. The overall joint position is monitored for low frequency joint position control but for robust dynamic rate control during maneuvers, under resolved rate joint control, the bandwidth and rate resolution of such a sensor becomes challenging. For resolved rate joint control, a separate relative rate motion sensor, e.g. inductosyn tachometer is mounted to the higher speed reduction gearbox input shaft. However, for accurate performance in this mode, the output precision and stiffness requirements for the gearing are high, e.g. class 13, and hence the cost and weight are also very high. These cost, weight, power and performance of these sensors is inadequate for applications capable of matching human operational performance in robust, reliable, smooth closed loop joint operation. For example, the resolution and bandwidth of such sensors would require heavy and expensive gearing, making such performance prohibitive for most applications. Furthermore, robot or manipulator end effector navigation, guidance and control that is based on electromagnetic sensors or optical vision sensors alone, is not capable of matching human performance and reliability, even when employing a state of the art digital computer.

Thus, there is a need for a simple, lightweight and inexpensive joint and end effector sensor and system solution for use in robotic manipulators. There is further a need for such a sensor system to provide robust, reliable and highly accurate sensing for lightweight joints to enable human operation performance levels. The present invention satisfies all these needs.

SUMMARY OF THE INVENTION

Robots and remote manipulators have the potential to replace expensive human labor and thus reduce business operating costs, but are currently too expensive, inferior and unreliable. In one embodiment of the present invention, two single-axis MEMS inertial sensors are aligned with each joint drive axis, in the general case, one mounted on the input side and one on the output side. In the case of an input side being earth ground or having otherwise known rate an output MEMS sensor is only required. The rate or velocity resolution of each individual inertial sensor and the computed relative rate from their difference is superior to that of state of the art tachometers or position encoders based on emerging MEMS gyro measured performance. This attribute in combination with their negligible size (mm or cm across) enables robust joint servo control with better than state of the art output resolution. For example, present MEMS chip resolution now approaching 0.1 deg/h would require a position encoder with 13 million physical position resolution elements or 50 nanometer spacing on 8 inch diameter sensing ring—a highly impractical value for optical sensor fabrication or operation. This new joint sensor and method replaces the relative rate and orientation sensors at each joint of a typical robotic manipulator and further enables a lighter weigh, lower cost, lower class precision gear train and sensor system A three-axis inertial measurement unit can be used for accurate inertial navigation of the end effector. This combination of elements enables superhuman performance and reliability when used with a state of the art digital computer. Further, this system can be provided at a lower cost and lower weight than conventional joints and end effectors.

A typical robotic manipulator of the invention includes at least one joint, each joint having a drive axis and at least one microelectromechanical system (MEMS) inertial sensor aligned with at least one drive axis providing sensing of a relative position of the drive axis. The joints of the manipulator couple one or more moveable links together. An end effector can be affixed to the manipulator to perform specific tasks. The robotic manipulator can include an inertial measurement unit (IMU) coupled to end link of the manipulator for determining a position and orientation of the end effector. A controller can be used, receiving a signal for the position of the robotic manipulator from the one or more MEMS inertial sensors and controlling each joint drive axis to change the position of the robotic manipulator. An accurate, precise and inexpensive MEMS inertial sensor is a key component to implementing the present invention.

Various MEMS inertial sensors suitable for application in embodiments of the present invention have been developed in recent years. For example, U.S. patent application Ser. No. 09/928,279, filed Aug. 10, 2001, and entitled "ISOLATED RESONATOR GYROSCOPE", by A. Dorian Challoner and U.S. patent application Ser. No. 10/370,953, filed Feb. 20, 2003, and entitled "ISOLATED RESONATOR GYROSCOPE WITH A DRIVE AND SENSE PLATE", by A. Dorian Challoner and Kirill V. Shcheglov; present MEMS sensors suitable for use in embodiments of the present invention.

BRIEF DESCRIPTION OF THE DRAWINGS

Referring now to the drawings in which like reference numbers represent corresponding parts throughout.

DETAILED DESCRIPTION INCLUDING PREFERRED EMBODIMENTS

Figure 1A:
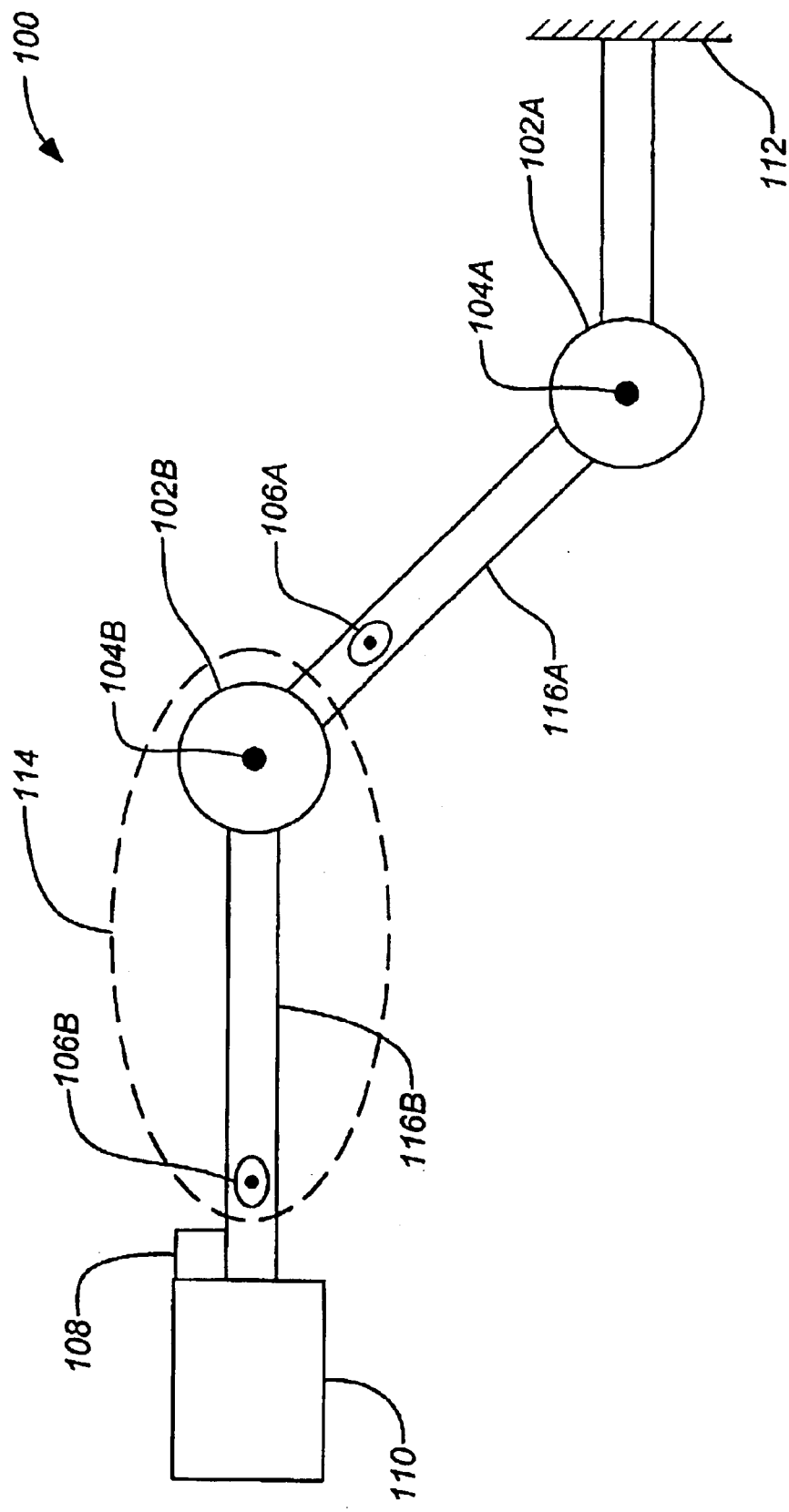
FIG. 1A is a schematic diagram of an exemplary robotic manipulator of the present invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

1.0 Overview

Conventional remote manipulators are controlled with a resolved rate or resolved position algorithm used to determine the desired change in end effector rate or position into a appropriate set of relative rate or position commands to each joint. In the present invention, however, MEMS gyro inertial rate measurements from joint output and input are subtracted to derive the joint relative rate required for joint servo control. Integration of this derived relative rate provides the relative orientation of the joint output relative to joint input.

Recently developed MEMS microgyros have a rate resolution of approximately 1 deg/h and a range of over 40 deg/s, making them very capable of replacing the tachometers and position encoders of conventional manipulators for many robotic applications. A servo tachometer and encoder set may cost several thousand dollars and require expensive mechanical integration onto a servo drive shaft, whereas two single-axis MEMS gyro chips may be very inexpensive when produced in high volume. Furthermore, they can be mounted off axis at any convenient location on a manipulator link.

Adequate bandwidth of up to approximately 200 Hz for minor loop joint stabilization can also be provided by virtue of the closed loop design of recent MEMS microgyros. For accurate positioning of the end effector, an inertial guidance law can be used to move the end effector to a desired inertial position. The inertial position of the end effector can be propagated using an inertial measurement unit (IMU) measurements and a strapdown inertial navigation algorithm, with or without aiding from an electromagnetic wave sensor. End effector rate commands derived by the guidance law can be resolved into individual joint rate commands as described above.

For manipulators fixed to the earth, the derived joint positions and manipulator geometry can be used to determine the end effector position. Further, the extra precision of a Mesogyro (over other MEMS gyros) can provide more accurate end effector positioning.

However, accelerometer bias in the IMU can lead to error build up in a gravitational field. By combining both IMU and MEMS gyro measurements in a least squares filter, the biases of all the inertial sensors can be calibrated when the manipulator end effector is fixed and attached to a reference point with a known position and orientation.

In the exemplary descriptions which follow, reference is made to the Figures by numerals identifying various elements of the invention. In some instances the reference numerals include an appending letter to identify a specific element shown which may be an example of a general element type which is identified by the numeral alone. For example, in FIG. 1A the first rotary joint 102A is identified as a specific example of a joint 102 in an embodiment of the invention.

2.0 Exemplary Robotic Manipulator Embodiment

FIG. 1A depicts a top view of an exemplary robotic manipulator 100 embodiment of the present invention. The robotic manipulator employs at least one joint 102 having a drive axis 104 and at least one microelectromechanical system (MEMS) inertial sensor 106 aligned with the drive axis 104 for sensing a position of the drive axis 104. A joint 102 is used to interconnect two links 116 (one of which may be a ground link 112). In the exemplary manipulator 100, a first joint 102A connects a ground link 112 and a first moving link 116A. In turn, moving link 116A is connected to a second moving link 116B via a second joint 102B. An end effector 110 is affixed to the end of the second moving link 116B.

In a general example of a manipulator joint, embodiments of the invention can employ a pair of single-axis MEMS sensors 106 aligned with a drive axis 104 to provide sensing of the relative position of the drive axis 104. The relative position of the drive axis is defined as the relative position between an output and an input side of a joint across the moving interface of the joint. Each sensor 106 is affixed to one of the links 116 interconnected by the joint 102. One of the pair of sensors 106 provides and input rate measurement, $\omega_i$, while the other sensors 106 provides an output rate measurement, $\omega_o$. The relative joint rate, $\beta_R$, is derived as the difference between the output and input rate measurements, $\omega_o - \omega_i$. The relative joint rate information can then be applied to a joint servo controller. For example, as shown in FIG. 1A, an output rate measurement can be provided by sensor 106B on moving link 116B and an input rate measurement can be provided by sensor 106A on moving link 116A about the drive axis 104B of joint 102B. The rate information, combined into a relative rate measurement, can be integrated to determine the position of the applicable joint.

From this example it can be seen that, depending on the particular application, one or more additional moving joints/sensor systems 114 can be appended to the end link 116B of the manipulator 100. The end effector 110 is affixed to the final joint sensor system 114 in the series. The relative joint rate for each additional joint 102 is determined relative to the output rate measurement of the preceding joint 102, i.e. treating that as the input rate measurement.

It should be noted that it is generally unnecessary to employ a sensor 106 on the ground link 112 as it does not move. In the example shown, sensor 106A alone provides the relative joint rate of joint 104A (as the input rate measurement would be a constant zero). However, an exception to this simplification would be in applications where the entire robotic manipulator 100 is disposed on a moving platform.

As positioning and orienting the end effector 110 are the primary objective of the robotic manipulator 100, a sensor unit such as an inertial measurement unit 108 (IMU) is affixed to the end link 116B of the robotic manipulator 100. The IMU 108 combines multiple sensors (e.g., MEMS inertial sensors) in a complete sensor unit which provides three-axis measurement information on its movement. A signal from the IMU 108 can provide precise measurements of the position and orientation of the end effector 110. This information can be used by a controller to position the end effector 110. It should be noted that for the exemplary embodiment of FIG. 1A, a portion of the position and orientation information from the IMU 108 may be redundant to the information from the sensor 106B as both are attached to the same link 116B and do not move relative to each other. Consequently, the relative rate for joint 102B described above can alternately be determined from the IMU 108 measurement and the sensor 106A measurement of link 116A; eliminating the need for sensor 106B.

Finally, although the foregoing example show rotary joints 102A, 102B, the type of joints 102 which can be employed in the manipulator 100 are unrestricted. In this sense, a joint 102 need only provide some type of driveable relative motion between two solid links 116. For example, rotary, linear or other joints 102 providing other relative motions may be used. However, complex motion (e.g., two axis, non-linear) may require more than one MEMS sensor to adequately measure.

As described above, the joints 102 of the manipulator 100 couple solid links 116 which are made moveable by the one or more joints 102. Embodiments of the present invention employ MEMS inertial sensors 106 affixed to moveable links 116 to sense the position of the robotic manipulator 100. An end effector 110 is then coupled to the robotic manipulator 100 (e.g., at an end link). Typically, the end effector 110 is a specialized device, designed to perform a particular task. For example, the end effector 110 can be a grasping tool, a welding tool, a cutting tool, a lifting tool, a driving tool or any other tool required to perform a particular task.

3.0 Complex Exemplary Robotic Manipulator

Figure 1B:
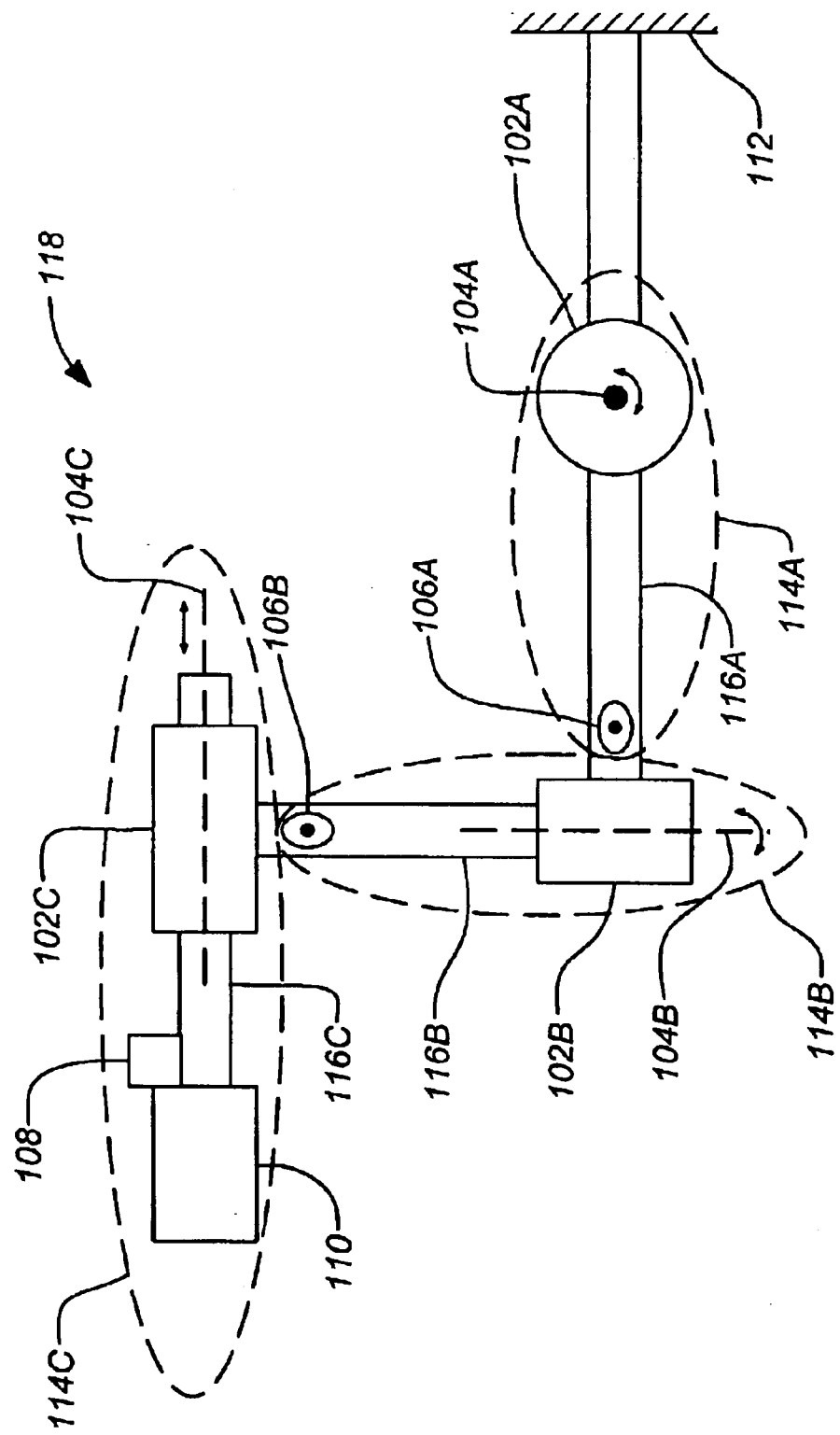
FIG. 1B is a schematic diagram of a more complex robotic manipulator of the present invention.

FIG. 1B is a schematic diagram of a more complex exemplary robotic manipulator 118 of the present invention. This manipulator 118 includes three joint sensor systems 114A–114C connected in series. The manipulator 118 includes a first rotary joint 102A and a second rotary joint 102B with perpendicular drive axes 104A, 104B. A third joint 102C of the manipulator 118 is a linear joint 102C which provides movement along its drive axis 104C. An IMU 108 is disposed on the last link 116C with the end effector 110 to measure its position and orientation. An inertial rate measurement, $\omega_1$ from the first MEMS sensor 106A is used to determine the relative rate, $\alpha_1 = \omega_1$ of the first rotary joint 102A. An inertial rate measurement, $\omega_2$ from the second MEMS sensor 106B is used in combination with that of the first sensor 106A to determine the relative rate, $\alpha_2 = \omega_2 - \omega_1$ of the second rotary joint 102B. Finally, an inertial velocity measurement, $v_3$ from the IMU 108 is used in combination with an inertial velocity measurement, $v_2$ from the second MEMS sensor 106B to determine the relative rate, $s = v_3 - v_2$ of the linear joint 102C.

4.0 Robotic Manipulator System

Figure 2:
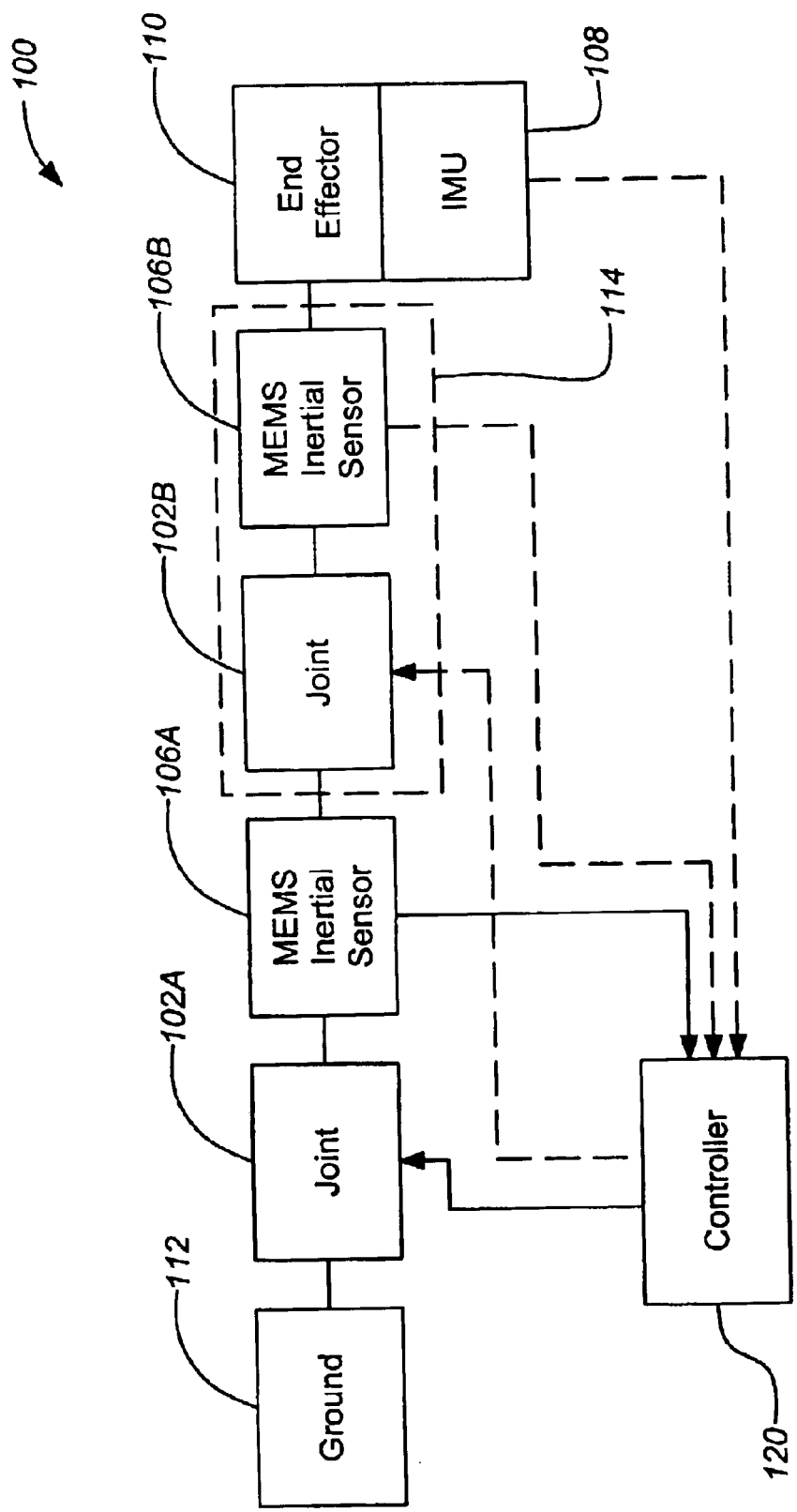
FIG. 2 is a functional block diagram of a typical embodiment of the present invention.

FIG. 2 is a functional block diagram of a full robotic manipulator system. A controller 120 receives signals for the position of the robotic manipulator 100 from the MEMS sensors 106 and any inertial measurement unit 108 and determines the rates and positions of the links 116 of the manipulator 100. The links 116 are not shown as separate elements, as they are carriers for the functional elements. Multiple additional joint/sensor systems 114 each including a joint the end effector. The controller 120 then directs each joint 102 drive axis to change the position of the robotic manipulator 100. The controller 120 may occasionally direct each joint drive axis to a home position to set a reference for the inertial measurement unit 108 and sensors 102.

For accurate positioning of the end effector 110 an inertial guidance law can be used to move the end effector 110 to a desired inertial position. The inertial position of the end effector is propagated using the IMU 108 measurements and a strapdown inertial navigation algorithm with or without aiding from sensors 106. End effector 110 rate commands derived by the guidance law can be resolved into individual joint 102 rate commands as described above. Alternatively, for manipulators fixed to the earth the derived joint 102 positions and manipulator geometry can be used to determine the end effector 110 position.

Under some conditions, (e.g. a constant gravitational field), accelerometer bias in some MEMS sensors units such as the IMU 108 can lead to error build up. Combining both the IMU 108 and MEMS sensor 106 measurements in a least-squares filter can refine the result. In addition, the biases of all the inertial sensors 106 can be calibrated when the manipulator end effector is fixed and attached to a reference point with known position and orientation. The controller can direct each joint drive axis to a home position to set a reference for the controller.

5.0 Producing a Robotic Manipulator

Figure 3:
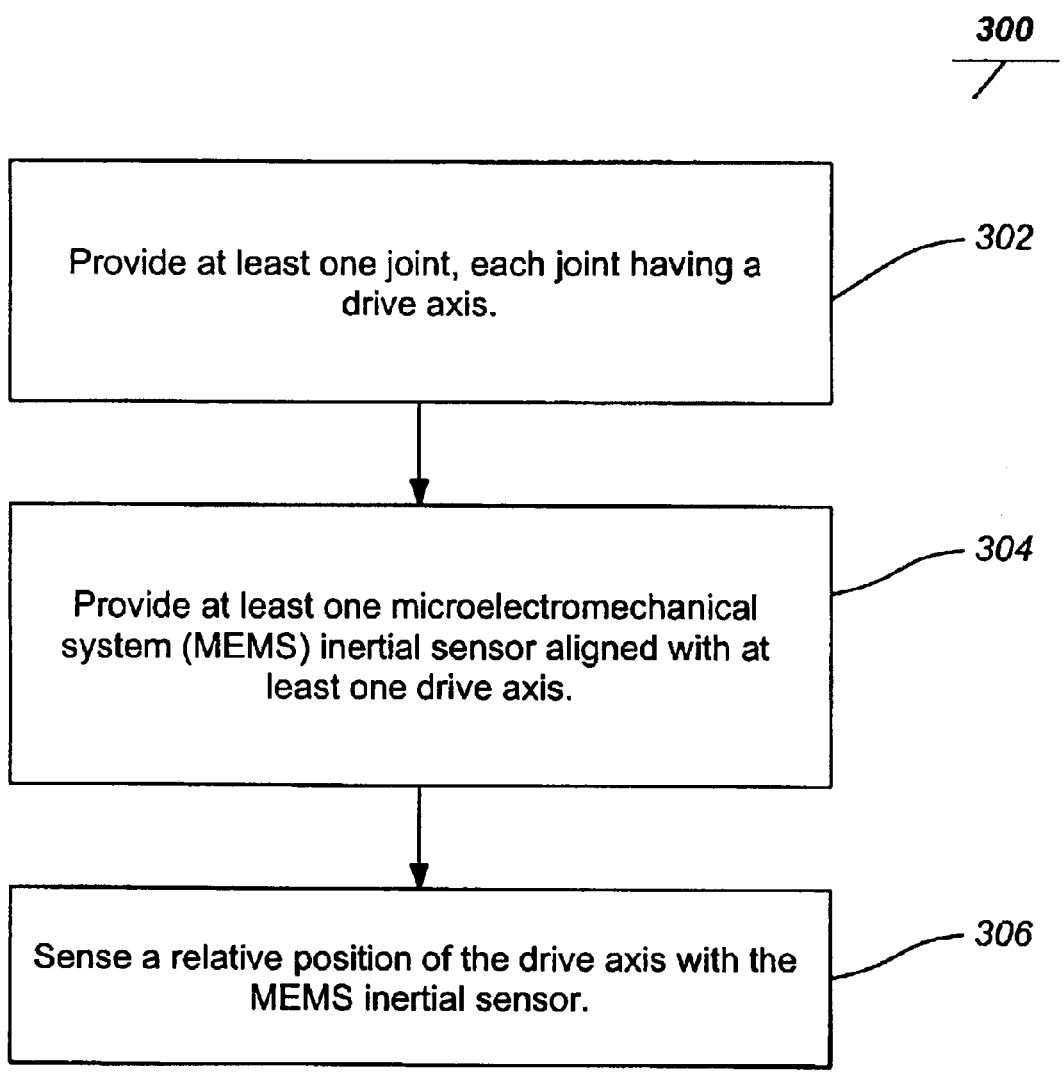
FIG. 3 is a flowchart of a typical method of producing a robotic manipulator of the present invention.

FIG. 3 is a flowchart of a typical method 300 of producing a robotic manipulator of the invention. The method comprises providing at least one joint, each joint having a drive axis at block 302. At least one microelectromechanical system (MEMS) inertial sensor aligned with at least one drive axis is provided at block 304. At block 306, a position of the drive axis is sensed with the MEMS inertial sensor. MEMS inertial sensors can be affixed to each moveable link to sense the position the drive axis of the at least one joint of the robotic manipulator. A pair of single-axis MEMS sensors can be provided to provide sensing of the position of the drive axis. A difference between rate information from each of the pair of MEMS sensors can be integrated to determine the position of the drive axis. The robotic manipulator is controlled in response to signals from the MEMS inertial sensors.

In addition, an end effector can be coupled to the robotic manipulator and positioned by the robotic manipulator. An inertial measurement unit can be coupled to the robotic manipulator at the end effector for determining the end effector position and orientation. Further, measurements from the inertial measurement unit and the at least one MEMS sensor can be combined in a least squares filter to produce refined control of the manipulator.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. A robotic manipulator, comprising:
    at least one joint, each joint having a drive axis; and
    a pair of single-axis microelectromechanical system (MEMS) inertial sensors are aligned with the drive axis, one of the MEMS inertial sensors on an input side of the drive axis and the other at the MEMS inertial sensors on the output side of the drive axis;
    wherein a relative rate is determined, the relative rate being a difference between inertial information from each of the pair of MEMS inertial sensors.

2. The robotic manipulator of claim 1, wherein the relative rate is integrated to determine the relative position of the drive axis.

3. The robotic manipulator of claim 2, wherein at least one joint comprises a rotary joint and the relative rate comprises a rate about the drive axis.

4. The robotic manipulator of claim 2, wherein at least one joint comprises a linear joint and the relative rate comprises a rate along the drive axis.

5. The robotic manipulator of claim 2, wherein the manipulator comprises at least one link moveable by the at least one joint.

6. The robotic manipulator of claim 5, wherein a MEMS inertial sensor is affixed to each moveable link to sense the relative rate position of the drive axis of the at least one joint of the robotic manipulator.

7. The robotic manipulator of claim 1, further comprising an end effector coupled to the robotic manipulator and positioned by the robotic manipulator.

8. The robotic manipulator of claim 7, further comprising an inertial measurement unit coupled to the robotic manipulator for determining an end effector position and orientation.

9. The robotic manipulator of claim 8, wherein measurements from the inertial measurement unit and at least one of the pair of the MEMS inertial sensor are combined in a least-squares filter.

10. The robotic manipulator of claim 1, further comprising a controller receiving a signal from at least one of the pair of MEMS inertial sensor and controlling the at least one joint drive axis in response to the signal to change a relative position of the joint drive axis.

11. The robotic manipulator of claim 10, wherein the controller directs each joint drive axis to a home position to set a reference for the controller.

12. A method of producing a robotic manipulator, comprising:

providing at least one joint, each joint having a drive axis;

aligning a pair of single-axis microelectromechanical system (MEMS) inertial sensors with the drive axis one of the MEMS inertial sensors on an input side of the drive axis and the other of the MEMS inertial sensors on the output side of the drive axis; and determining a relative rate, the relative rate being a difference between inertial information from each of the pair MEMS inertial sensors.

13. The method of claim 12, wherein the relative rate is integrated to determine the relative position of the drive axis.

14. The method of claim 13, wherein at least one joint comprises a rotary joint and the relative rate comprises a rate about the drive axis.

15. The method of claim 13, wherein at least one joint comprises a linear joint and the relative rate comprises a rate along the drive axis.

16. The method of claim 13, wherein the manipulator comprises at least one link moveable by the at least one joint.

17. The robotic manipulator of claim 16, wherein a MEMS inertial sensor is affixed to each moveable link to sense the relative rate of the drive axis of the at least one joint of the robotic manipulator.

18. The method of claim 12, further comprising coupling an end effector to the robotic manipulator and positioned by the robotic manipulator.

19. The method of claim 18, further comprising coupling an inertial measurement unit to the robotic manipulator for determining an end effector position and orientation.

20. The method of claim 19, wherein measurements from the inertial measurement unit and at least one of the pair of MEMS inertial sensors are combined in a least-squares filter.

21. The method of claim 12, further comprising receiving a signal with a controller from at least one of the pair of MEMS inertial sensors and controlling the at least one joint drive axis in response to the signal to change a relative position of the joint drive axis.

22. The method of claim 21, wherein the controller directs each joint drive axis to a home position to set a reference for the controller.

* * * * *